US010579143B2

(12) United States Patent
Du

(10) Patent No.: US 10,579,143 B2
(45) Date of Patent: Mar. 3, 2020

(54) HAPTIC FEEDBACK GENERATION

(71) Applicant: Beijing Zhigu Rui Tuo Tech Co., Ltd, Beijing (CN)

(72) Inventor: Lin Du, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 59 days.

(21) Appl. No.: 15/311,517

(22) PCT Filed: Apr. 30, 2015

(86) PCT No.: PCT/CN2015/077924
§ 371 (c)(1),
(2) Date: Nov. 15, 2016

(87) PCT Pub. No.: WO2015/172663
PCT Pub. Date: Nov. 19, 2015

(65) Prior Publication Data
US 2017/0083097 A1 Mar. 23, 2017

(30) Foreign Application Priority Data
May 16, 2014 (CN) .......................... 2014 1 0209726

(51) Int. Cl.
*G06F 3/01* (2006.01)
(52) U.S. Cl.
CPC .............. *G06F 3/016* (2013.01); *G06F 3/011* (2013.01)
(58) Field of Classification Search
None
See application file for complete search history.

(56) References Cited

U.S. PATENT DOCUMENTS

| 2004/0267133 | A1 | 12/2004 | Podany |
| 2008/0132313 | A1 | 6/2008 | Rasmussen et al. |
| 2010/0013613 | A1 | 1/2010 | Weston |
| 2010/0231367 | A1 | 9/2010 | Cruz-Hernandez et al. |
| 2011/0163985 | A1 | 7/2011 | Bae et al. |
| 2012/0062516 | A1* | 3/2012 | Chen ........................ G06F 3/016 345/174 |

(Continued)

FOREIGN PATENT DOCUMENTS

| CN | 101907922 A | 12/2010 |
| CN | 202102397 U | 1/2012 |

(Continued)

OTHER PUBLICATIONS

International Search Report for PCT Application No. PCT/CN2015/077924, dated Jul. 22, 2015, 4 pages.

*Primary Examiner* — Kenneth B Lee, Jr.
(74) *Attorney, Agent, or Firm* — Amin, Turocy & Watson, LLP

(57) ABSTRACT

The present application provides a haptic feedback generation method and apparatus, and relates to the field of haptic feedback. The method comprises: in response to that a user body touches an object, sending a second mechanical wave that is used to form a haptic signal at a touch position with a first mechanical wave generated by the user body. A source for forming the haptic signal can be at the touch position, to cause that an effective haptic feedback to a user can be formed with little energy consumption, and poor experience of the user caused by vibration of an entire object is avoided.

27 Claims, 10 Drawing Sheets

(56) References Cited

U.S. PATENT DOCUMENTS

2014/0192005 A1* 7/2014 Wakuda .................. G06F 3/041
                                                                              345/173

FOREIGN PATENT DOCUMENTS

| CN | 102349039 A | 2/2012 |
|---|---|---|
| CN | 102736288 A | 10/2012 |
| CN | 103760970 A | 4/2014 |
| CN | 103984414 A | 8/2014 |
| CN | 103995591 A | 8/2014 |
| WO | 2013060933 A1 | 5/2013 |
| WO | 2015172662 A1 | 11/2015 |

* cited by examiner

In response to that a user body touches an object, send a second mechanical wave that is used to form a haptic signal at a touch position of the object with a first mechanical wave generated by the user body — S110
FIG. 1a
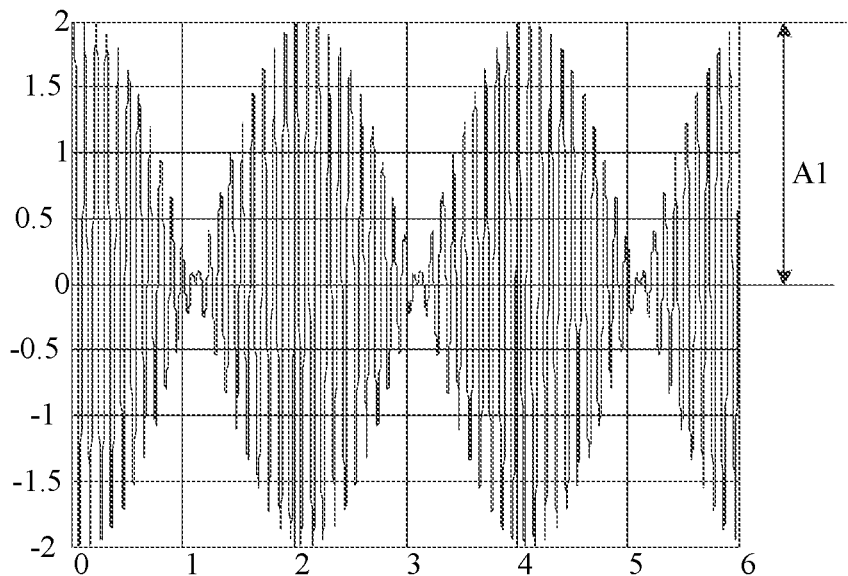
FIG. 1b
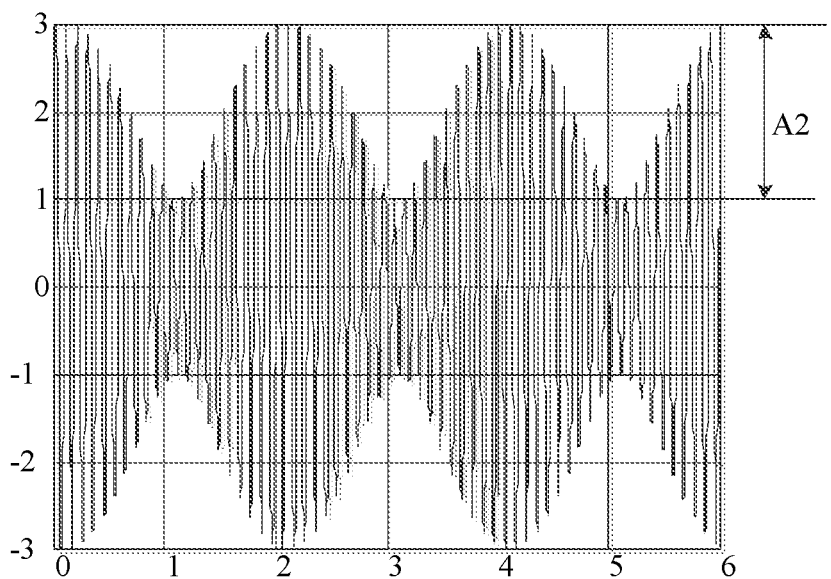
FIG. 1c

HAPTIC FEEDBACK GENERATION

RELATED APPLICATION

The present application is a U.S. National Stage filing under 35 U.S.C. § 371 of international patent cooperation treaty (PCT) application No. PCT/CN2015/077924, filed Apr. 30, 2015, and entitled "HAPTIC FEEDBACK GENERATION", which claims the benefit of priority to Chinese Patent Application No. 201410209726.6, filed on May 16, 2014, which applications are hereby incorporated into the present application by reference herein in their respective entireties.

TECHNICAL FIELD

The present application relates to the field of haptic feedback technologies, and in particular, to a haptic feedback generation method and apparatus.

BACKGROUND

Haptic feedback is a technology in which an apparatus gives a haptic feedback to a user operation. For example, when a user clicks a corresponding menu on a smart phone or a tablet computer, the apparatus may vibrate under drive of a built-in motor, to cause that the user may know that the apparatus has received an operation instruction. Haptic feedback is widely applied when a user drives a car or when observation is inconvenient for a user.

In an existing haptic feedback technology, a built-in motor drives vibration of the entire apparatus, which causes large energy consumption and affects user experience.

SUMMARY

An example, non-limiting objective of the present application is to provide a haptic feedback generation method and apparatus.

According to an example aspect of at least one embodiment of the present application, a haptic feedback generation method is provided, and comprises:

in response to that a user body touches an object, sending a second mechanical wave that is used to form a haptic signal at a touch position of the object with a first mechanical wave generated by the user body.

According to another example aspect of at least one embodiment of the present application, a haptic feedback generation method is provided, and comprises:

in response to that a user body touches an object, sending, to the object through a medium, a second mechanical wave that is used to form a haptic signal at a touch position of the object with a first mechanical wave generated by the object, wherein the medium comprises at least one part of the user body.

According to another example aspect of at least one embodiment of the present application, a haptic feedback generation apparatus is provided, and comprises:

a sending module, configured to: in response to that a user body touches an object, send a second mechanical wave that is used to form a haptic signal at a touch position of the object with a first mechanical wave generated by the user body.

According to another example aspect of at least one embodiment of the present application, a haptic feedback generation apparatus is provided, and comprises:

a sending module, configured to: in response to that a user body touches an object, send, to the object through a medium, a second mechanical wave that is used to form a haptic signal at a touch position of the object with a first mechanical wave generated by the object.

In the methods and apparatuses of the embodiments of the present application, a source for forming a haptic signal is at a touch position, to cause that an effective haptic feedback to a user can be formed with little energy consumption, and poor experience of the user caused by vibration of an entire object is avoided.

BRIEF DESCRIPTION OF THE DRAWINGS

The disclosure will become more fully understood from the detailed description given herein below for illustration only, and thus are not limitative of the disclosure, and wherein:

FIG. 1a is a flowchart of a haptic feedback generation method according to an example embodiment of the present application;

FIG. 1b is an example waveform diagram of a mechanical wave obtained through superposition when an amplitude of a first mechanical wave is the same as an amplitude of a second mechanical wave;

FIG. 1c is an example waveform diagram of a mechanical wave obtained through superposition when a ratio of an amplitude of a first mechanical wave to an amplitude of a second mechanical wave is 1:2;

DETAILED DESCRIPTION

Figure 1D:
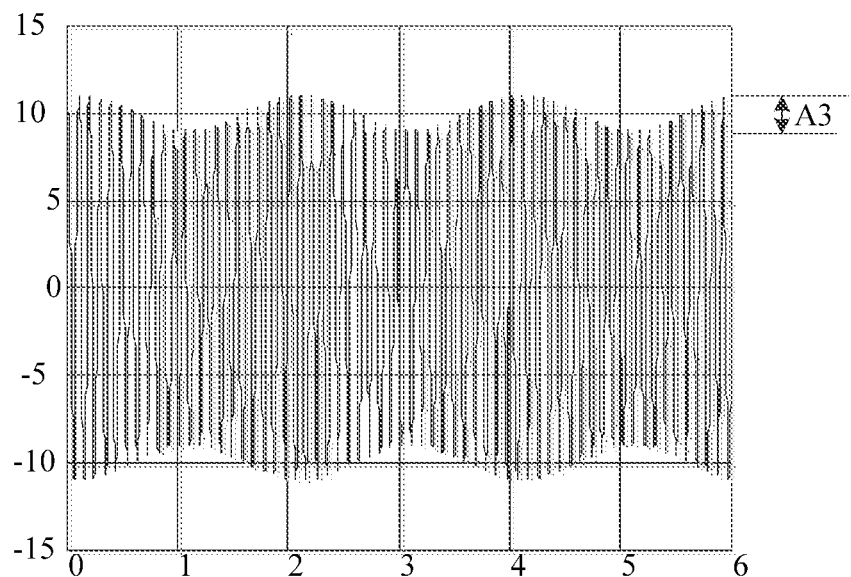
FIG. 1d is an example waveform diagram of a mechanical wave obtained through superposition when a ratio of an amplitude of a first mechanical wave to an amplitude of a second mechanical wave is 1:10.

The following describes in detail the example embodiments of the present application with reference to the accompanying drawings and the embodiments. The following embodiments are used to describe the present application, rather than limiting a scope of the present application.

A person skilled in the art can understand that the sequence numbers of the following steps do not represent priorities of the executive sequences, and the executive sequences of each step can be determined according to functions and internal logics and should not make any limitation on the implementation process according to the embodiments of the present application.

In the embodiments of the present application, at least one of a first mechanical wave and a second mechanical wave may be an ultrasonic wave or a mechanical wave at another frequency band. During study, the inventor finds that, the ultrasonic wave is a wave having a frequency higher than 20000 Hz, which has good directivity, and strong penetrating power, can obtain acoustic energy that is relatively concentrated, and can be transmitted for a long distance in water, and about 65% of the human body is formed by water; therefore, the ultrasonic wave is suitable for transmission by using the human body as a transmission medium. Meanwhile, a frequency of the ultrasonic wave is beyond a listening scope of human beings; therefore, a user may not sense existence of ultrasonic wave, and no noise impact is imposed on the user.

FIG. 1a is a flowchart of a haptic feedback generation method according to an embodiment of the present application. This method may be implemented on a haptic feedback generation apparatus. As shown in FIG. 1a, the method comprises:

S110: In response to that a user body touches an object, send a second mechanical wave that is used to form a haptic signal at a touch position of the object with a first mechanical wave generated by the user body.

In the method provided by this embodiment, when the user body touches the object, the second mechanical wave is sent, wherein the second mechanical wave forms the haptic signal at the touch position of the object with the first mechanical wave generated by the user body, that is, a source of the haptic signal is at the touch position, to cause that an effective haptic feedback to the user can be formed with little energy consumption, and poor experience for the user caused by vibration of an entire object can be avoided.

The user body may directly touch the object, or may indirectly touch the object, for example, the user clicks the object with a glove on. The object may be an apparatus such as a smart phone, a tablet computer, or a car-mounted display screen.

An implementation principle of the method in the present application is as follows:

assuming that an amplitude of the first mechanical wave is $A_0$, an initial phase is $\varphi_1$, and a frequency is $\omega_1$, an expression of the trigonometric function is:

$$\psi_1 = A_0 \cos(\Phi_1 - \omega_1 t);$$

assuming that an amplitude of the second mechanical wave is $A_0$, an initial phase is $\varphi_2$, and a frequency is $\varphi_2$, an expression of the trigonometric function is:

$$\varphi_2 = A_0 \cos(\varphi_2 - \omega_2 t); \text{ and}$$

therefore, an expression of the trigonometric function of a new mechanical wave obtained after superposition of the first mechanical wave and the second mechanical wave is:

$$\psi = \psi_1 + \psi_2 = 2A_0 \cos\frac{(\omega_1+\omega_2)t - (\varphi_1-\varphi_2)}{2} \cos\frac{(\omega_1-\omega_2)t - (\varphi_1-\varphi_2)}{2}.$$

As can be seen from the expression of the trigonometric function of the new mechanical wave, the new mechanical wave comprises a first component having a frequency being $(\omega_1+\omega_2)/2$ and a second component having a frequency being $(\omega_1-\omega_2)/2$. During study, the inventor finds that, a sensitive-frequency interval of a vibration feedback for the skin of people is 20 to 500 Hz. Therefore, assuming that the first mechanical wave and the second mechanical wave are ultrasonic waves (frequencies of the two waves are higher than 20000 Hz), the user cannot sense the wave, and the user also cannot sense a waveform component having a frequency being $(\omega_1+\omega_2)/2$ in the new mechanical wave obtained through superposition. Meanwhile, $(\omega_1-\omega_2)/2$ may be enabled to be between 20 to 500 Hz by appropriately controlling a difference between the frequency of the first mechanical wave and the frequency of the second mechanical wave, to cause that the user can sense a waveform component having a frequency being $(\omega_1-\omega_2)/2$, and a haptic feedback signal is formed, for example, $\omega_1$ and $\omega_2$ are 40 kHz and 40.5 kHz respectively, and then, two frequency components comprised in the obtained new mechanical wave are 40.25 kHz and 250 Hz respectively, wherein the human body cannot sense the frequency component being 40.25 kHz, but can sense the frequency component being 250 Hz, to cause that the haptic feedback is obtained.

In addition, the first mechanical wave and the second mechanical wave are not necessarily ultrasonic waves, for example, a frequency $\omega_1$ of the first mechanical wave is 1000 Hz, and a frequency $\omega_2$ of the second mechanical wave is 1100 Hz; in this case, although ears of people can sense (that is, listen to) the two mechanical waves, the skin of people is not sensitive to the wave. Accordingly, the new mechanical wave obtained through superposition comprises a first component having a frequency being 1050 Hz and a second component having a frequency being 50 Hz, and the skin of the user is not sensitive to the second component (cannot sense the vibration), and is sensitive to the first component (senses the vibration), to cause that the haptic feedback may also be formed.

Assuming that a value of the amplitude $A_0$ is 1, a waveform diagram of the new mechanical wave obtained through simulation is shown in FIG. 1b, wherein an effective amplitude that the user can sense is $A_1 = 2 = 2A_0$.

In addition, during study, the inventor further finds that, when amplitudes of the first mechanical wave and the second mechanical wave are different, a new mechanical wave obtained through superposition also comprises the first component having a frequency being $(\omega_1+\omega_2)/2$ and a second component having a frequency being $(\omega_1-\omega_2)/2$. Besides, an effective amplitude that the user can sense always is two times a smaller value between the amplitude of the first mechanical wave and the amplitude of the second mechanical wave.

For example, FIG. 1c is a waveform diagram of a new mechanical wave obtained when the amplitude $A_0$ of the first mechanical wave remains unchanged, and the amplitude of the second mechanical wave increases by one time (that is, the amplitude is $2A_0$). As can be seen, in this case, the effective amplitude that the user can sense is $A_2=2$, that is, equal to $2A_0$.

For another example, FIG. 1d is a waveform diagram of a new mechanical wave obtained when the amplitude $A_0$ of the first mechanical wave remains unchanged, and the amplitude of the second mechanical wave increases by nine times (that is, the amplitude is $10A_0$). As can be seen, in this case, the effective amplitude that the user can sense is $A_3=2$, that is, equal to $2A_0$.

As can be seen, a smaller amplitude between the amplitude of the first mechanical wave and the amplitude of the second mechanical wave determines an effective amplitude that the user can sense; meanwhile, because the amplitude is in direct proportion to energy, a larger amplitude indicates more energy consumption; therefore, when the amplitude of the first mechanical wave is much closer to the amplitude of the second mechanical wave, that is, when a difference between the amplitude of the first mechanical wave at the touch position and the amplitude of the second mechanical wave at the touch position is smaller than a preset value (such as 1 um), the entire energy utilization is higher, and more energy is saved; otherwise, more energy is consumed. The amplitudes of the first mechanical wave and the second mechanical wave at the touch position may be obtained through actual detection.

The touch position of the object may correspond to different information. For example, assuming that the object is a smart phone, different positions on the smart phone correspond to different APPs (applications). When a user clicks different positions on the smart phone, the user actually operates different APPs, that is, different touch positions correspond to different APPs. For another example, assuming that the object is a tablet computer displaying a game interface, as the game goes on, the same position on the tablet computer may correspond to different virtual objects, for example, with the change of time, one target position may correspond to stones, river water, clouds, or the like; in this way, when the user clicks the target position at different time points, the user actually operates different virtual objects, that is, at different time points, the same touch position may correspond to different virtual objects. Therefore, to form different haptic feedbacks corresponding to different operation objects (for example, an APP or a virtual object), in an example embodiment, step S110 may comprise: acquiring information related to the touch position. In addition, in step S110, the second mechanical wave is sent according to the information related to the touch position.

Figure 2:
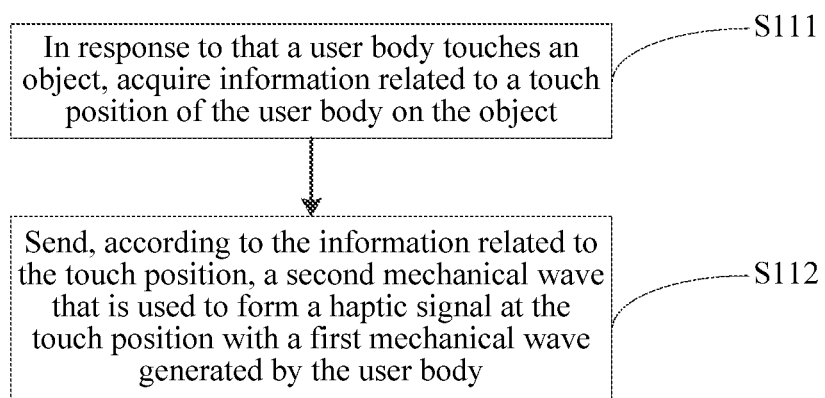
FIG. 2 is a detailed flowchart of step S110 in an example embodiment of the present application.

Referring to FIG. 2, that is, an actual execution process of step S110 comprises:

S111: In response to that the user body touches the object, acquire the information related to the touch position of the user body on the object.

S112: Send, according to the information related to the touch position, the second mechanical wave that is used to form the haptic signal at the touch position with the first mechanical wave generated by the user body.

The information related to the touch position may be coordinate information of the touch position, or, may be display content corresponding to the touch position.

The second mechanical wave is sent according to the information related to the touch position, that is, different second mechanical waves are sent in correspondence to different operation objects, to cause that the haptic signal corresponds to the information related to the touch position, and the user senses a haptic feedback corresponding to the operation object. For example, when a virtual object displayed at the touch position is stones, a second mechanical wave B1 is sent, wherein a new mechanical wave obtained after superposition of the second mechanical wave B1 and the first mechanical wave enables the user to have a rough and solid touch feeling; for another example, when a virtual object displayed at the touch position is river water, a second mechanical wave B2 is sent, wherein a new mechanical wave obtained after superposition of the second mechanical wave B2 and the first mechanical wave enables the user to have a soft and wet touch feeling.

Figure 3:
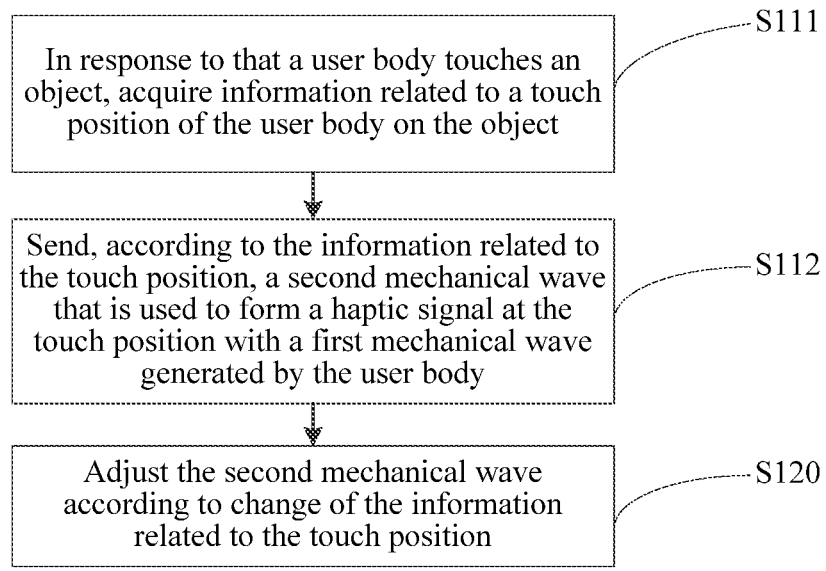
FIG. 3 is a flowchart of a method in an example embodiment of the present application.

When the user continuously operates the object, for example, the user continuously clicks different positions on the screen of the tablet computer, or, the user performs a touch and hold operation on the same position on the screen of the tablet computer, content displayed at the same position changes as the time changes. To enable the user to obtain a haptic feedback corresponding to the information related to the touch position in this process, referring to FIG. 3, in an example embodiment, the method further comprises:

S120: Adjust the second mechanical wave according to change of the information related to the touch position.

Accordingly, in this method, an adjusted second mechanical wave may also be sent, to cause that a new haptic signal is formed through superposition of the adjusted second mechanical wave and the first mechanical wave.

When the first mechanical wave is a fixed mechanical wave (for example, a universal mechanical wave specified in the industry), as described above, the second mechanical wave is sent only according to the information related to the touch position. However, considering that differences between apparatus manufacturers cause that it is difficult for the first mechanical waves to be consistent, in one example embodiment, step S110 may comprise: acquiring a parameter of the first mechanical wave and the information related to the touch position. In addition, in step S110, the second mechanical wave is sent according to the parameter of the first mechanical wave and the information related to the touch position.

Figure 4:
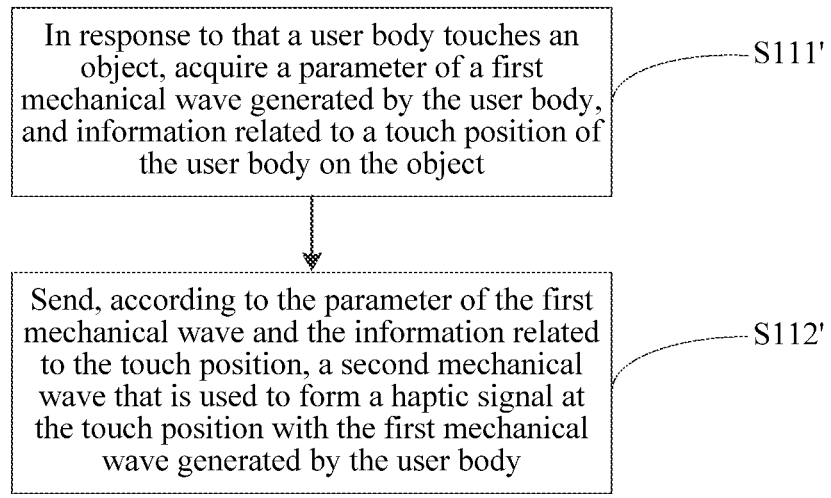
FIG. 4 is a detailed flowchart of step S110 in another example embodiment of the present application.

That is, Referring to FIG. 4, in this example embodiment, an actual execution process of step S110 comprises:

S111': In response to that the user body touches the object, acquire a parameter of the first mechanical wave generated by the user body, and the information related to the touch position of the user body on the object.

S112': Send, according to the parameter of the first mechanical wave and the information related to the touch position, the second mechanical wave that is used to form the haptic signal at the touch position with the first mechanical wave generated by the user body.

In addition, this embodiment of the present application further provides a computer readable medium, comprising a computer readable instruction that is executed to perform the following operations: executing the operation of step S110 of the method in the example embodiment shown in FIG. 1a.

In conclusion, in the method according to this embodiment of the present application, a first mechanical wave and a second mechanical wave may be superposed to form a haptic signal at a touch position of an object, and different second mechanical waves may be sent according to information related to the touch position (and a parameter of the first mechanical wave), so as to generate different haptic signals corresponding to the information related to the touch position, thereby further improving user experience.

Figure 5:
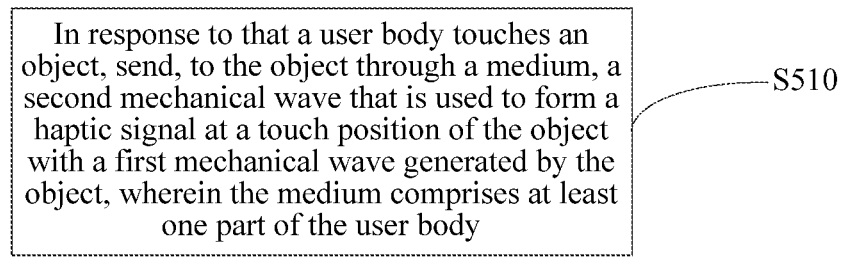
FIG. 5 is a flowchart of a haptic feedback generation method according to another example embodiment of the present application.

FIG. 5 is a flowchart of a haptic feedback generation method according to another embodiment of the present application. As shown in FIG. 5, the method comprises:

S510: In response to that a user body touches an object, send, to the object through a medium, a second mechanical wave that is used to form a haptic signal at a touch position of the object with a first mechanical wave generated by the object, wherein the medium comprises at least one part of the user body.

In the method of this embodiment, when the user body touches the object, the second mechanical wave is sent to the object through the medium comprising at least one part of the user body, and the second mechanical wave and the first mechanical wave that is generated by the object are superposed to form the haptic signal at the touch position, to cause that an effective haptic feedback to the user is formed with little energy consumption, and poor experience of the user caused by vibration of an entire object is avoided.

An implementation principle of the method of this embodiment is similar to that of the foregoing embodiment, and no further details are provided herein.

The object may be an apparatus such as a smart phone, a tablet computer, or a car-mounted display screen.

The second mechanical wave is transmitted to the object through the medium, and is further superposed with the first mechanical wave. The medium comprises at least one part of the user body, that is, the medium is not necessarily formed all by the user body. In other words, in addition to directly touching the object, the user body may also indirectly touch the object, for example, the user clicks the object with a glove on. The medium may comprise any part of the user body; however, generally, the user tends to touch an object with a hand; therefore, the medium may comprise the hand of the user.

The touch position of the object may correspond to different information. For example, assuming that the object is a smart phone, different positions on the smart phone correspond to different APPs. When the user clicks different positions on the smart phone, the user actually operates different APPs, that is, different touch positions correspond to different APPs; for another example, assuming that the object is a tablet computer displaying a game interface, as the game goes on, the same position on the tablet computer may correspond to different virtual objects, for example, with the change of time, one target position may correspond to stones, river water, clouds, or the like; in this way, when the user clicks the target position at different time points, the user actually operates different virtual objects, that is, at different time points, the same touch position may correspond to different virtual objects. Therefore, to form different haptic feedbacks corresponding to different operation objects (for example, an APP or a virtual object), in an example embodiment, step S510 may comprise: acquiring information related to the touch position. In addition, in step S510, the second mechanical wave is sent according to the information related to the touch position.

Figure 6:
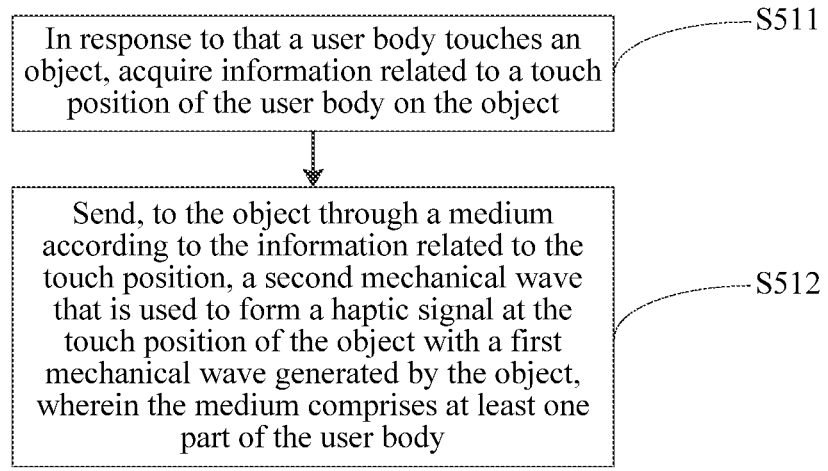
FIG. 6 is a detailed flowchart of step S510 in an example embodiment of the present application.
Figure 7:
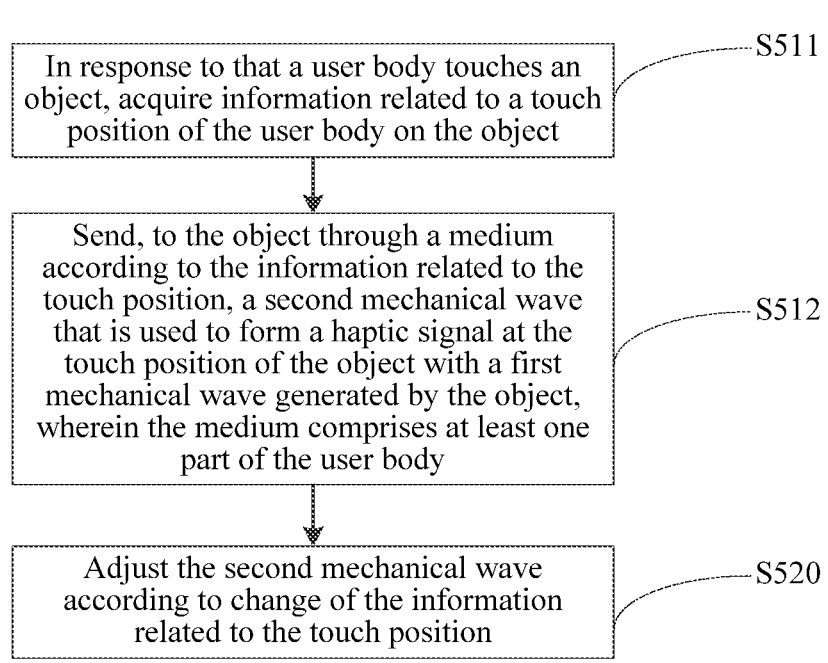
FIG. 7 is a flowchart of a method in an example embodiment of the present application.

That is, Referring to FIG. 6, in this example embodiment, an actual execution process of step S510 comprises:

S511: In response to that the user body touches the object, acquire the information related to the touch position of the user body on the object.

S512: Send, to the object through the medium according to the information related to the touch position, the second mechanical wave that is used to form the haptic signal at the touch position of the object with the first mechanical wave generated by the object, wherein the medium comprises at least one part of the user body.

The information related to the touch position may be coordinate information of the touch position, or, may be display content corresponding to the touch position. In addition, the information related to the target position may be acquired in a manner of communicating with the object, for example, in response to that the user body touches the target position, a request packet is sent to the object, and the object feeds back, according to the request packet, the information related to the touch position.

The second mechanical wave is sent according to the information related to the touch position, that is, different second mechanical waves are sent in correspondence to different operation objects, to cause that the haptic signal corresponds to the information related to the touch position, and the user senses a haptic feedback corresponding to the operation object. For example, when a virtual object displayed at the touch position is stones, a second mechanical wave B1 is sent, wherein a new mechanical wave obtained after superposition of the second mechanical wave B1 and the first mechanical wave enables the user to have a rough and solid touch feeling; for another example, when a virtual object displayed at the touch position is river water, a second mechanical wave B2 is sent, wherein a new mechanical wave obtained after superposition of the second mechanical wave B2 and the first mechanical wave enables the user to have a soft and wet touch feeling.

When the user continuously operates the object, for example, the user continuously clicks different positions on the screen of the tablet computer, or, the user performs a touch and hold operation on the same position on the screen of the tablet computer, content displayed at the same position changes as the time changes. To enable the user to obtain a haptic feedback corresponding to the information related to the touch position in this process, referring to 7, in an example embodiment, the method further comprises:

S520: Adjust the second mechanical wave according to change of the information related to the touch position.

Accordingly, in this method, an adjusted second mechanical wave may also be sent, to cause that a new haptic signal is formed through superposition of the adjusted second mechanical wave and the first mechanical wave.

When the first mechanical wave is a fixed mechanical wave (for example, a universal mechanical wave specified in the industry), as described above, the second mechanical wave is sent only according to the information related to the touch position. However, considering that differences between apparatus manufacturers cause that it is difficult for the first mechanical waves to be consistent, in one example embodiment, step S510 may comprise: acquiring a parameter of the first mechanical wave and the information related to the touch position. In addition, in step S510, the second mechanical wave is sent according to the parameter of the first mechanical wave and the information related to the touch position.

Figure 8:
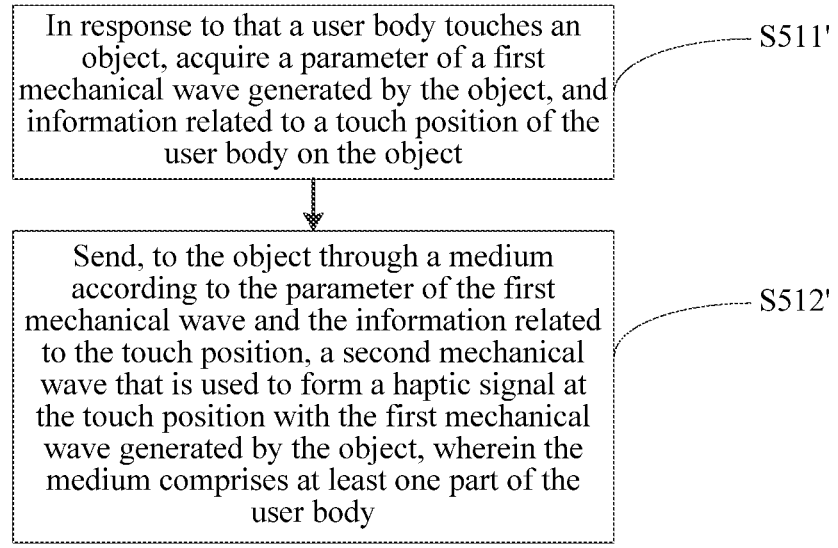
FIG. 8 is a detailed flowchart of step S510 in another example embodiment of the present application.

That is, Referring to FIG. 8, in this example embodiment, an actual execution process of step S510 comprises:

S511': In response to that the user body touches the object, acquire a parameter of the first mechanical wave generated by the object, and the information related to the touch position of the user body on the object.

S512': Send, to the object through the medium according to the parameter of the first mechanical wave and the information related to the touch position, the second mechanical wave that is used to form the haptic signal at the touch position with the first mechanical wave generated by the object, wherein the medium comprises at least one part of the user body.

In addition, this embodiment of the present application further provides a computer readable medium, comprising a computer readable instruction that is executed to perform the following operations: executing the operation of step S510 of the method in the example embodiment shown in FIG. 5.

In conclusion, in the method according to this embodiment of the present application, a first mechanical wave and a second mechanical wave may be superposed to form a haptic signal at a touch position of an object, and different second mechanical waves may be sent according to information related to the touch position (and a parameter of the first mechanical wave), so as to generate different haptic signals corresponding to the information related to the touch position, thereby further improving user experience.

Figure 9:
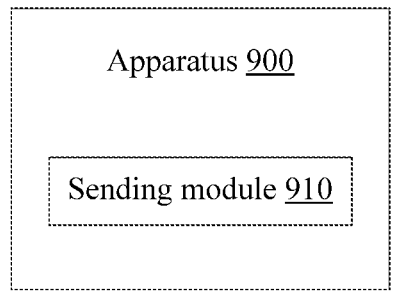
FIG. 9 is a schematic structural diagram of a module of a haptic feedback generation apparatus according to an example embodiment of the present application.

FIG. 9 is a schematic structural diagram of a module of a haptic feedback generation apparatus according to an embodiment of the present application. As shown in FIG. 9, the apparatus 900 may comprise:

a sending module 910, configured to: in response to that a user body touches an object, send a second mechanical wave that is used to form a haptic signal at a touch position of the object with a first mechanical wave generated by the user body.

In the apparatus of this embodiment of the present application, when the user body touches the object, the second mechanical wave is sent, and the second mechanical wave and the first mechanical wave that is generated by the user body are superposed to from the haptic signal at the touch position of the object, to cause that an effective haptic feedback to the user is formed with little energy consumption, and poor experience of the user caused by vibration of an entire object is avoided.

The apparatus may be a paster, and during usage, the apparatus is attached to the body; or the apparatus may be integrated inside the object. The object may be an apparatus such as a smart phone, a tablet computer, or a car-mounted display screen. The user body may directly touch the object, or may indirectly touch the object, for example, the user clicks the object with a glove on.

Figure 10:
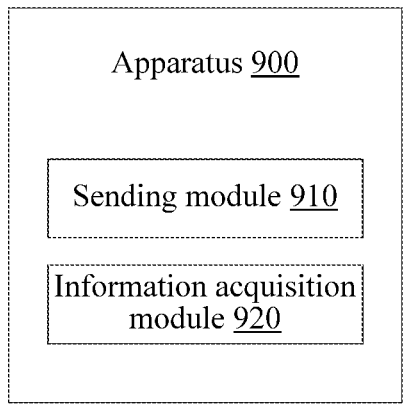
FIG. 10 is a schematic structural diagram of modules of a haptic feedback generation apparatus in an example embodiment of the present application.

The touch position of the object may correspond to different information. To form different haptic feedbacks corresponding to different operation objects (for example, an APP or a virtual object), referring to FIG. 10, the apparatus may further comprise:

an information acquisition module 920, configured to acquire information related to the touch position, that is, configured to: in response to that the user body touches the object, acquire the information related to the touch position of the user body on the object.

In addition, the sending module 910 is configured to send the second mechanical wave according to the information related to the touch position, that is, configured to send, according to the information related to the touch position, the second mechanical wave that is used to form the haptic signal at the touch position with the first mechanical wave generated by the user body.

Figure 11:
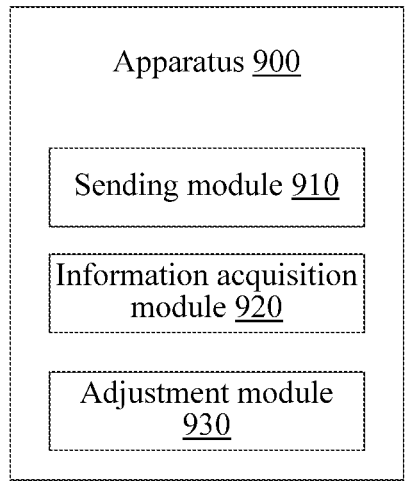
FIG. 11 is a schematic structural diagram of modules of a haptic feedback generation apparatus in another example embodiment of the present application.

Referring to FIG. 11, the apparatus 900 may further comprise:

an adjustment module 930, configured to adjust the second mechanical wave according to change of the information related to the touch position. Accordingly, the sending module is further configured to send an adjusted second mechanical wave, to cause that a new haptic signal is formed through superposition of the adjusted second mechanical wave and the first mechanical wave.

Figure 12:
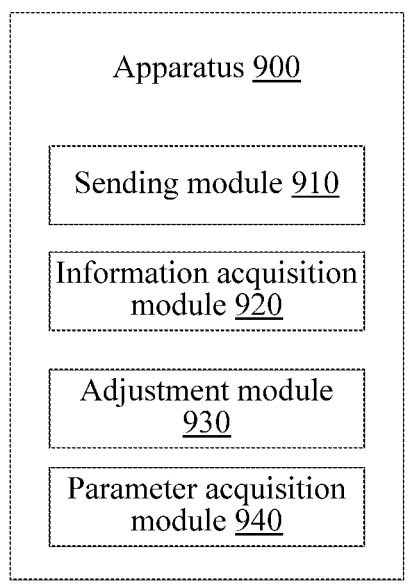
FIG. 12 is a schematic structural diagram of modules of a haptic feedback generation apparatus in another example embodiment of the present application.

Considering that differences between apparatus manufacturers cause that it is difficult for the first mechanical waves to be consistent, in an example embodiment, referring to FIG. 12, the apparatus 900 further comprises:

a parameter acquisition module 940, configured to acquire a parameter of the first mechanical wave, that is, in response to that the user body touches the object, acquire the parameter of the first mechanical wave generated by the user body.

Accordingly, the sending module 910 is configured to send the second mechanical wave according to the parameter of the first mechanical wave and the information related to the touch position, that is, send, according to the parameter of the first mechanical wave and the information related to the touch position, the second mechanical wave that is used to form the haptic signal at the touch position with the first mechanical wave generated by the user body.

In addition, to improve precision of the apparatus, the sending module 910 further comprises an exciter array, wherein the exciter array comprises multiple array elements. By using this structure design and combined with the beamforming technology, the second mechanical wave has better directivity, so as to form the haptic signal at the touch position more accurately.

In conclusion, in the apparatus according to this embodiment of the present application, a first mechanical wave and a second mechanical wave may be superposed to form a haptic signal at a touch position of an object, and different second mechanical waves may be sent according to information related to the touch position (and a parameter of the first mechanical wave), so as to generate different haptic signals corresponding to the information related to the touch position, thereby further improving user experience.

Figure 13:
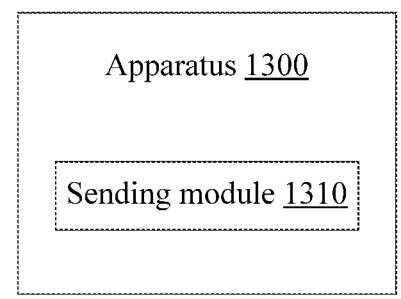
FIG. 13 is a schematic structural diagram of a module of a haptic feedback generation apparatus according to example embodiment of the present application.

FIG. 13 is a schematic structural diagram of a module of a haptic feedback generation apparatus according to another embodiment of the present application. The apparatus may be a portable apparatus such as a ring or a wrist strap. As shown in FIG. 13, the apparatus 1300 may comprise:

a sending module 1310, configured to: in response to that a user body touches an object, send, to the object through a medium, a second mechanical wave that is used to form a haptic signal at a touch position of the object with a first mechanical wave generated by the object.

In the apparatus of this embodiment, when the user body touches the object, the second mechanical wave is sent to the object through the medium comprising at least one part of the user body, and the second mechanical wave and the first mechanical wave that is generated by the object are superposed to form the haptic signal at the touch position, to cause that an effective haptic feedback to the user is formed with little energy consumption, and poor experience of the user caused by vibration of an entire object is avoided.

The object may be an apparatus such as a smart phone, a tablet computer, or a car-mounted display screen. The user body may directly touch the object, or may indirectly touch the object, for example, the user clicks the object with a glove on.

Figure 14:
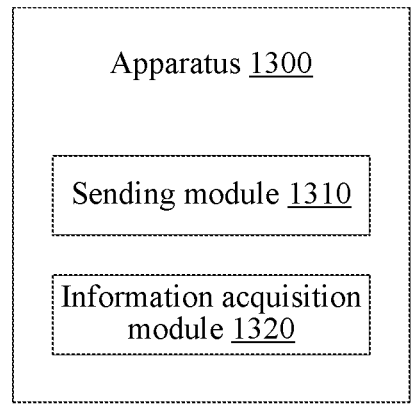
FIG. 14 is a schematic structural diagram of modules of a haptic feedback generation apparatus in an example embodiment of the present application.

The touch position of the object may correspond to different information. To form different haptic feedbacks corresponding to different operation objects (for example, an APP or a virtual object), referring to FIG. 14, the apparatus may further comprise:

an information acquisition module 1320, configured to acquire information related to the touch position, that is, configured to: in response to that the user body touches the object, acquire the information related to the touch position of the user body on the object.

In addition, the sending module 1310 is configured to send the second mechanical wave according to the information related to the touch position, that is, configured to send, to the object through the medium according to the information related to the touch position, the second mechanical wave that is used to form the haptic signal at the touch position with the first mechanical wave generated by the object.

Figure 15:
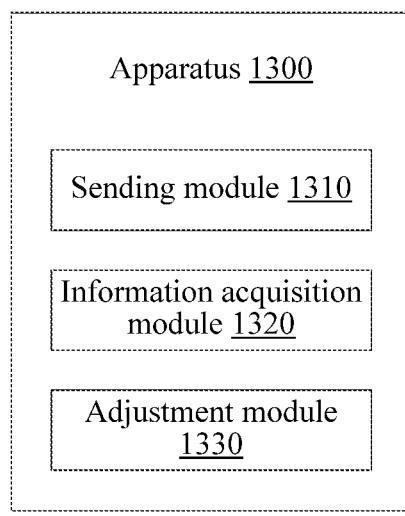
FIG. 15 is a schematic structural diagram of modules of a haptic feedback generation apparatus in another example embodiment of the present application.

Referring to FIG. 15, the apparatus 1300 may further comprise:

an adjustment module 1330, configured to adjust the second mechanical wave according to change of the information related to the touch position. Accordingly, the sending module 1310 is further configured to send an adjusted second mechanical wave, to cause that a new haptic signal is formed through superposition of the adjusted second mechanical wave and the first mechanical wave.

Figure 16:
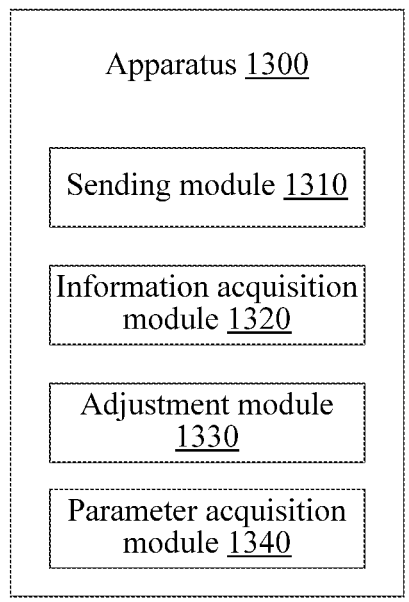
FIG. 16 is a schematic structural diagram of modules of a haptic feedback generation apparatus in another example embodiment of the present application.

Considering that differences between apparatus manufacturers cause that it is difficult for the first mechanical waves to be consistent, in an example embodiment, referring to FIG. 16, the apparatus 1300 may further comprise:

a parameter acquisition module 1340, configured to acquire a parameter of the first mechanical wave, that is, in response to that the user body touches the object, acquire the parameter of the first mechanical wave generated by the object.

Accordingly, the sending module 1310 is configured to send the second mechanical wave according to the parameter of the first mechanical wave and the information related to the touch position, that is, send, to the object through the medium according to the parameter of the first mechanical wave and the information related to the touch position, the second mechanical wave that is used to form the haptic signal at the touch position with the first mechanical wave generated by the object.

In addition, to improve precision of the apparatus, the sending module 1310 further comprises an exciter array, wherein the exciter array comprises multiple array elements. By using this structure design and combined with the beamforming technology, the second mechanical wave has better directivity, so as to form the haptic signal at the touch position more accurately.

In conclusion, in the apparatus according to this embodiment of the present application, a first mechanical wave and a second mechanical wave may be superposed to form a haptic signal at a touch position of an object, and different second mechanical waves may be sent according to information related to the touch position (and a parameter of the first mechanical wave), so as to generate different haptic signals corresponding to the information related to the touch position, thereby further improving user experience.

Figure 17:
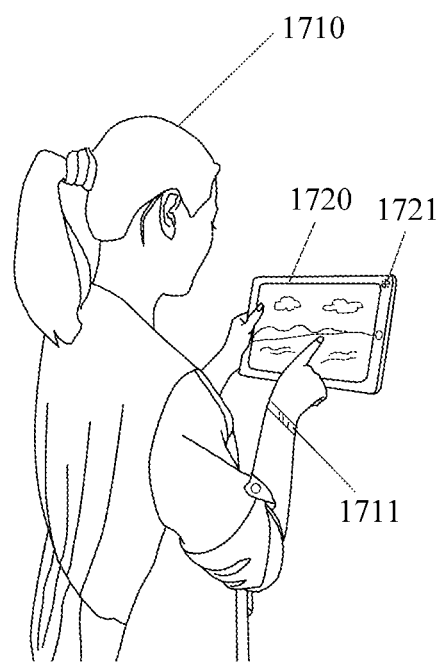
FIG. 17 is an example schematic diagram of an application scenario of a haptic feedback generation apparatus according to the present application.

FIG. 17 is a schematic diagram of an application scenario of a haptic feedback generation apparatus according to the present application. A user 1710 holds a tablet computer and plays a game, and in response to that a right index finger of the user 1710 clicks river water on a game interface, a smart wrist strap 1711 worn by the user sends an ultrasonic wave to the tablet computer 1720 through the hand of the user 1710, a smart paster 1721 set on the tablet computer 1720 sends another ultrasonic wave, the two ultrasonic waves are superposed at the touch position of the right index finger of the user 1710 on the tablet computer 1720, and the right index finger of the user 1710 senses the haptic feedback signal that the river water flows.

In addition, in response to that the user 1710 clicks other places on the game interface, for example, the clouds on the sky, by adjusting the ultrasonic wave sent by the smart wrist strap 1711 and/or the ultrasonic wave sent by the smart paster, the right index finger of the user 1710 may sense a new haptic feedback signal.

Figure 18:
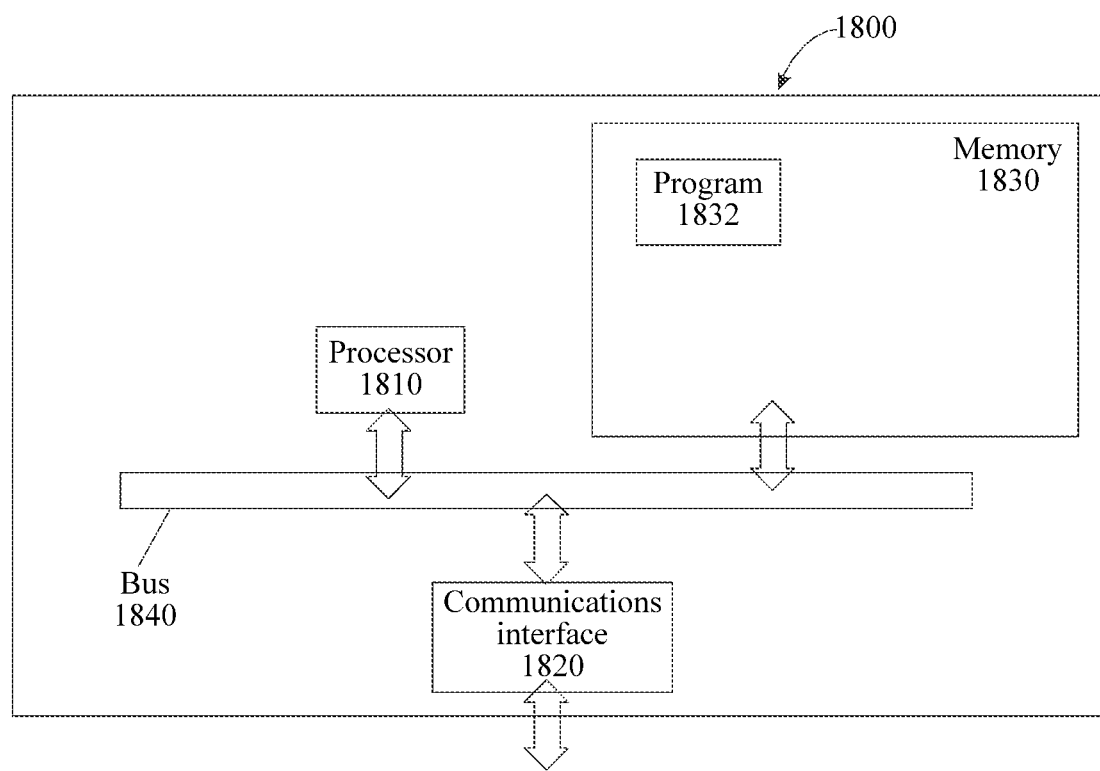
FIG. 18 is a schematic structural diagram of hardware of a haptic feedback generation apparatus according to an example embodiment of the present application.

A hardware structure of a haptic feedback generation apparatus according to another embodiment of the present application is shown in FIG. 18. The specific embodiment of the present application does not limit a specific implementation of the haptic feedback generation apparatus. Referring to FIG. 18, the apparatus 1800 may comprise:

a processor 1810, a communications interface 1820, a memory 1830, and a communications bus 1840, wherein:

the processor 1810, the communications interface 1820, and the memory 1830 communicate with each other by using the communications bus 1840.

The communications interface 1820 is configured to communicate with another network element.

The processor 1810 is configured to execute a program 1832, and specifically, may be configured to execute related steps in the method embodiment shown in FIG. 1.

Specifically, the program 1832 may comprise program code, wherein the program code comprises a computer operation instruction.

The processor 1810 may be a central processing unit (CPU), or an application specific integrated circuit (ASIC), or one or more integrated circuits configured to implement the embodiments of the present application.

The memory 1830 is configured to store the program 1832. The memory 1830 may comprise a high speed random access memory (RAM), or a non-volatile memory, for example, at least one magnetic memory. The program 1832 specifically may execute the following step:

in response to that a user body touches an object, sending a second mechanical wave that is used to form a haptic signal at a touch position of the object with a first mechanical wave generated by the user body.

For specific implementations of the steps in the program 1832, reference may be made to corresponding steps or modules in the foregoing embodiments, and no further details are provided herein again. A person skilled in the art may clearly know that, for convenient and brief description, for the specific working process of the foregoing apparatus and module, reference may be made to the corresponding descriptions in the foregoing method embodiment, and no further details are provided herein again.

Figure 19:
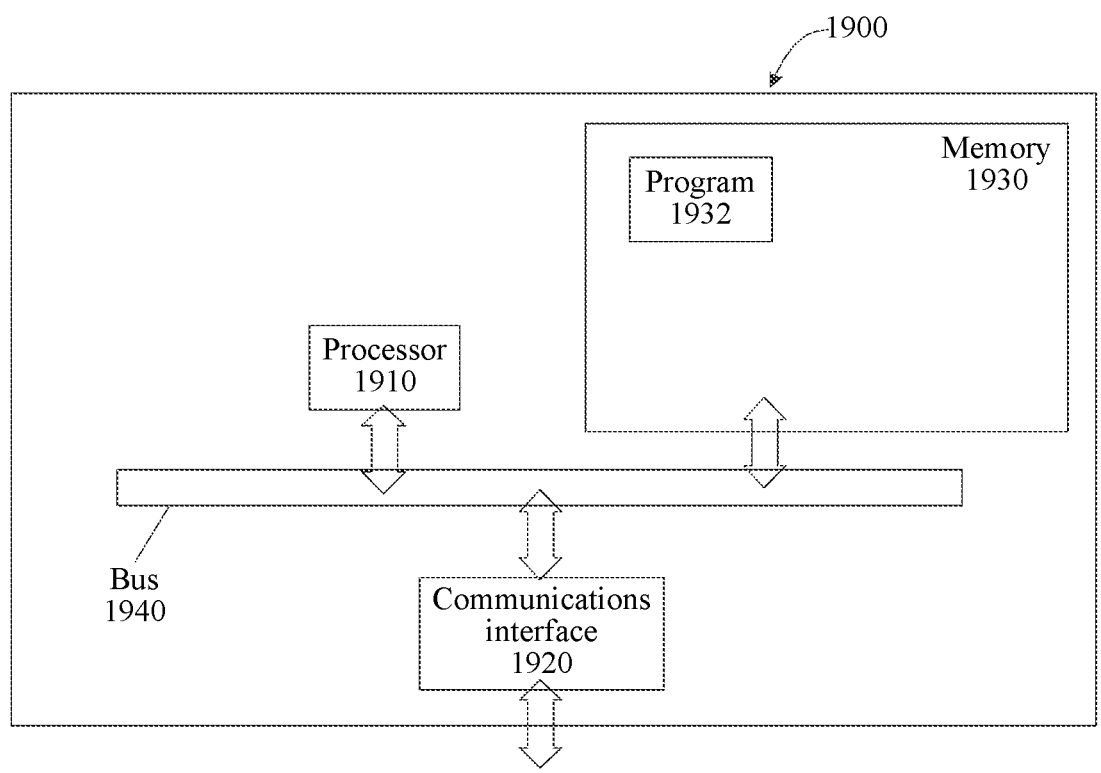
FIG. 19 is a schematic structural diagram of hardware of a haptic feedback generation apparatus according to another example embodiment of the present application.

A hardware structure of a haptic feedback generation apparatus according to an embodiment of the present application is shown in FIG. 19. The specific embodiment of the present application does not limit a specific implementation of the haptic feedback generation apparatus. Referring to FIG. 19, the apparatus 1900 may comprise:

a processor 1910, a communications interface 1920, a memory 1930, and a communications bus 1940, wherein:

the processor 1910, the communications interface 1920, and the memory 1930 communicate with each other by using the communications bus 1940.

The communications interface 1920 is configured to communicate with another network element.

The processor 1910 is configured to execute a program 1932, and specifically, may be configured to execute related steps in the method embodiment shown in FIG. 5.

Specifically, the program 1932 may comprise program code, wherein the program code comprises a computer operation instruction.

The processor 1910 may be a central processing unit (CPU), or an application specific integrated circuit (ASIC), or one or more integrated circuits configured to implement the embodiments of the present application.

The memory 1930 is configured to store the program 1932. The memory 1930 may comprise a high speed RAM memory, or a non-volatile memory, for example, at least one magnetic memory. The program 1932 specifically may execute the following step:

in response to that a user body touches an object, sending, to the object through a medium, a second mechanical wave that is used to form a haptic signal at a touch position of the object with a first mechanical wave generated by the object, wherein the medium comprises at least one part of the user body.

For specific implementations of the steps in the program 1932, reference may be made to corresponding steps or modules in the foregoing embodiments, and no further details are provided herein again. A person skilled in the art may clearly know that, for convenient and brief description, for the specific working process of the foregoing apparatus and module, reference may be made to the corresponding descriptions in the foregoing method embodiment, and no further details are provided herein again.

A person of ordinary skill in the art may be aware that, with reference to the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a controller, a network device, or the like) to perform all or a part of the steps of the methods described in the embodiments of the present application. The foregoing storage medium comprises: any medium that can store program code, such as a USB flash drive, a removable hard disk, a read-only memory (ROM), a RAM, a magnetic disk, or an optical disc.

The foregoing example embodiments are merely used for describing the present application, rather than limiting the present application. A person of ordinary skill in the art may make various changes and modifications without departing from the spirit and scope of the present application, and therefore, all equivalent technical solutions shall belong to the scope of the present application, and the protection scope of the present application shall be subject to the claims.

What is claimed is:

1. A method, comprising:

in response to determining that a user body has touched an object, sending, by a device comprising a processor, a second mechanical wave that is used to form a haptic signal at a touch position of the object with a first mechanical wave generated by the user body, wherein a frequency of a waveform component of the haptic signal formed through superposition of the first mechanical wave and the second mechanical wave is between 20 Hz and 500 Hz.

2. A method, comprising:

in response to determining that a user body is touching a first object, sending, by a device comprising a processor to the first object via a first transmission medium, a second mechanical wave that is used to form a haptic signal at a touch position of the first object with a first mechanical wave generated by the first object, wherein the first transmission medium comprises at least one part of the user body and at least one part of a second object, and wherein a frequency of a waveform component of the haptic signal formed through superposition of the first mechanical wave and the second mechanical wave is between 20 Hz and 500 Hz.

3. The method according to claim 1, further comprising:

acquiring information related to the touch position.

4. The method according to claim 3, wherein the sending the second mechanical wave comprises:

sending the second mechanical wave according to the information related to the touch position.

5. The method according to claim 3, further comprising:

acquiring a parameter of the first mechanical wave.

6. The method according to claim 5, wherein the sending the second mechanical wave comprises:

sending the second mechanical wave according to the parameter of the first mechanical wave and the information related to the touch position.

7. The method according to claim 3, further comprising:

adjusting the second mechanical wave according to a change of the information related to the touch position.

8. The method according to claim 3, wherein the haptic signal corresponds to the information related to the touch position.

9. The method according to claim 1, wherein the first mechanical wave or the second mechanical wave is an ultrasonic wave.

10. The method according to claim 1, wherein a difference between a first amplitude of the first mechanical wave at the touch position and a second amplitude of the second mechanical wave at the touch position is less than a preset value.

11. The method according to claim 2, wherein the first transmission medium comprises a hand of the user.

12. An apparatus, comprising:
a memory that stores executable modules; and
a processor, coupled to the memory, that executes or facilitates execution of the executable modules, comprising:
a sending module configured to:
in response to determining that a user body touches an object, send a second mechanical wave that is used to form a haptic signal at a touch position with a first mechanical wave generated by the user body, wherein a frequency of a waveform component of the haptic signal formed through superposition of the first mechanical wave and the second mechanical wave is between 20 Hz and 500 Hz.

13. An apparatus, comprising:
a memory that stores executable modules; and
a processor, coupled to the memory, that executes or facilitates execution of the executable modules, comprising:
a sending module configured to:
in response to determining that a user body is touching a first object, send, to the first object via a first transmission medium, a second mechanical wave that is used to form a haptic signal at a touch position with a first mechanical wave generated by the first object, wherein the first transmission medium comprises at least one part of the user body and at least one part of a second object, and wherein a frequency of a waveform component of the haptic signal formed through superposition of the first mechanical wave and the second mechanical wave is between 20 Hz and 500 Hz.

14. The apparatus according to claim 12, wherein the executable modules further comprise:
an information acquisition module configured to acquire information related to the touch position.

15. The apparatus according to claim 14, wherein the sending module is configured to send the second mechanical wave according to the information related to the touch position.

16. The apparatus according to claim 14, wherein the executable modules further comprise:
a parameter acquisition module configured to acquire a parameter of the first mechanical wave.

17. The apparatus according to claim 16, wherein the sending module is configured to send the second mechanical wave according to the parameter of the first mechanical wave and the information related to the touch position.

18. The apparatus according to claim 14, wherein the executable modules further comprise:
an adjustment module, configured to adjust the second mechanical wave according to change of the information related to the touch position.

19. The apparatus according to claim 12, wherein the sending module comprises an exciter array.

20. The apparatus according to claim 13, wherein the apparatus is a wearable apparatus.

21. A computer readable storage device, comprising at least one executable instruction, which, in response to execution, causes an apparatus comprising a processor to perform operations, comprising:
in response to determining that a user body is touching an object, sending a second mechanical wave that is used to form a haptic signal at a touch position of the object with a first mechanical wave generated by the user body, wherein a frequency of a waveform component of the haptic signal formed through superposition of the first mechanical wave and the second mechanical wave is between 20 Hz and 500 Hz.

22. An apparatus, characterized by comprising a processor and a memory, the memory storing computer executable instructions, the processor being connected to the memory via a communication bus, and when the apparatus operates, the processor executes the computer executable instructions stored in the memory, so that the apparatus executes operations, comprising:
in response to a determination that a user body has touched an object, sending a second mechanical wave that is used to form a haptic signal at a touch position of the object with a first mechanical wave generated by the user body, wherein a frequency of a waveform component of the haptic signal formed through superposition of the first mechanical wave and the second mechanical wave is between 20 Hz and 500 Hz.

23. A computer readable storage device, comprising at least one executable instruction, which, in response to execution, causes an apparatus comprising a processor to perform operations, comprising:
in response to a determination that a user body is touching a first object, sending, to the first object via a first transmission medium, a second mechanical wave that is used to form a haptic signal at a touch position of the first object with a first mechanical wave generated by the first object, wherein the first transmission medium comprises at least one part of the user body and at least one part of a second object, and wherein a frequency of a waveform component of the haptic signal formed through superposition of the first mechanical wave and the second mechanical wave is between 20 Hz and 500 Hz.

24. An apparatus, characterized by comprising a processor and a memory, the memory storing computer executable instructions, the processor being connected to the memory via a communication bus, and when the apparatus operates, the processor executes the computer executable instructions stored in the memory, so that the apparatus executes operations, comprising:
in response to a determination that a user body touches a first object, sending, to the first object via a first transmission medium, a second mechanical wave that is used to form a haptic signal at a touch position of the first object with a first mechanical wave generated by the first object, wherein the first transmission medium comprises at least one part of the user body and at least one part of a second object, and wherein a frequency of a waveform component of the haptic signal formed through superposition of the first mechanical wave and the second mechanical wave is between 20 Hz and 500 Hz.

25. The method according to claim 2, further comprising:
acquiring information related to the touch position, wherein the sending the second mechanical wave comprises sending the second mechanical wave according to the information related to the touch position.

26. The apparatus according to claim 13, wherein the executable modules further comprises:
an information acquisition module configured to acquire information related to the touch position, and wherein the sending module is configured to send the second mechanical wave according to the information related to the touch position.

27. The apparatus of claim 22, the operations further comprising:
acquiring information related to the touch position.

* * * * *